United States Patent Office 3,392,191
Patented July 9, 1968

3,392,191
PREPARATION OF ACRYLIC ACID ESTERS
Gordon Roy Ensor, Llangollen, and John Dennis White, Wrexham, Wales, assignors to Monsanto Chemicals Limited, London, England, a British company
No Drawing. Filed Mar. 17, 1964, Ser. No. 352,644
Claims priority, application Great Britain, Mar. 19, 1963, 10,929/63
7 Claims. (Cl. 260—486)

This invention relates to a process for the production of esters of acrylic acids.

Acrylic esters are widely used in the plastics industry as polymerizable monomers. Because acrylate esters, especially the α-alkyl acrylate esters, tend to polymerize under conventional esterification conditions, they are, for the most part, produced by indirect methods.

By the process of the present invention, however, acrylate esters can be obtained in satisfactory yields by the direct esterification of an acrylic acid with an alcohol.

The process of the invention is one for the production of an ester of an acrylic acid, in which the vapor of the acid and the vapor of an alcohol are contacted with an acid catalyst.

A preferred catalyst is one in which a thermally stable acid of low volatility (for example, sulfuric acid or benzenesulfonic acid) is absorbed on a solid support.

In general, the process can be operated at a temperature in the range of 70° C. to 250° C., for instance, 100° C. to 180° C.

In a preferred method of operating the process, the reactant materials, usually as a solution of the acrylic acid in the alcohol, are vaporized by contact with a solid supported catalyst maintained at an appropriate elevated temperature. A solution of the acrylic acid in the alcohol, used as a precursor of the reactant vapors, can, if desired, contain a small amount of a polymerization inhibitor, for example hydroquinone.

Acrylic acids that can be esterified by the present process include acrylic acid itself and α-alkyl acrylic acids. The process is especially useful for the production of esters of methacrylic acid.

In practice, the alcohols usually employed are the lower alkanols, methanol, ethanol, the propanols and the butanols. Esters where the esterifying group is derived from a higher alkanol having either a straight or branched chain, such as n-hexanol or isooctanol, a cycloalkanol such as cyclohexanol, or an aryl alkanol such as benzyl alcohol, can be obtained by this process.

Preferably the vapor that is contacted with the catalyst contains an excess of the alcohol relative to the acid. The molar ratio of alcohol to acid can, for example, be within a range of from about 1.5:1 to about 10:1, and good results are obtained where the molar ratio is about 4:1 or 5:1.

Preferred catalysts are thermally stable acids of relatively low volatility. These include inorganic acids such as sulfuric acid and phosphoric acid, and organic sulfonic acids such as benzenesulfonic acid and toluenesulfonic acid. An acid catalyst can often be employed in the form of an ester or in the form of an anhydride. An ester is preferably one where the esterifying group is derived from the same alcohol as is used to esterify the acrylic acid. Thus methyl sulfate, for example, is an effective catalyst in the production of methyl acrylates. Suitable acid anhydrides include, for example, phosphorus pentoxide and sulfur trioxide.

The acid catalyst is most effective when it is absorbed on a solid support, the solid being, for instance, in the form of granules, such that vapors containing the acrylic acid and the alcohol can pass freely through a bed of the catalyst. Materials that can be used to form the granular support include, for example, magnesia, silica, alumina and keiselguhr.

The amount of acid catalyst held by such a support can vary within relatively wide limits, for example, from 1% to about 25% by weight of the support; 5% to 10% is often a convenient amount in practice.

Preferably the reactant vapors are diluted with an inert gas, for example, nitrogen or argon. A stream of inert gas can conveniently be used as a carrier to entrain the reactant vapors to bring them into contact with the catalyst and to convey the reaction products from the catalyst zone. Where the liquid reactants are vaporized by contact with the hot catalyst bed, the vapors can be diluted by an inert gas stream fed into the catalyst zone concurrently, the inert gas also serving to convey the reaction products from the reaction zone. The velocity of the inert gas stream can be adjusted to give an optimum contact time between the reactants and the catalyst.

The required acrylic ester can be isolated, for example, by condensing the effluent vapors and separating any unreacted starting materials, precautions being taken against polymerization. Selective solvent extraction using, for example, ether is often a suitable way to separate an acrylic ester from an acrylic acid since it does not involve subjecting the materials to excessively elevated temperatures.

The invention is illustrated by the following examples.

EXAMPLE 1

This example describes the production of methyl methacrylate using toluenesulfonic acid on a solid support as catalyst.

A solution of 148 grams (1.0 mol) of methacrylic acid and 0.22 gram of hydroquinone in 128 grams (4.0 mols) of methanol was fed at 50 cc. per hour into a preheater maintained at 100° C. and through which a stream of nitrogen was passing at 380 cc. per minute (measured at N.T.P.).

The vapors leaving the preheater were directed to a vertical reaction tube containing a bed of catalyst pellets, 25 cm. in depth and 2 cm. in diameter, maintained at a temperature of 120–140° C. The catalyst had been prepared by steeping pellets consisting essentially of a mixture of silica and magnesia with a saturated solution of p-toluenesulfonic acid in methanol, decanting off the excess solution, and drying the pellets in the reactor at the reaction temperature.

The gases leaving the reaction tube were passed through condensers, giving a condensate containing 65 grams of recovered methacrylic acid (corresponding to a conversion of 56%) and 72.5 grams of methyl methacrylate (corresponding to a yield of 75.5%).

EXAMPLE 2

This example describes the production of methyl methacrylate using sulfuric acid on a solid support as catalyst.

A solution of 148 grams (1.0 mol) of methacrylic acid and 0.22 gram of hydroquinone in 192 grams (6.0 mols) of methanol was dropped at a rate of 50 cc. per hour onto the head of a vertical column of catalyst pellets, 22 cm. in depth and 2 cm. in diameter, in a tubular reactor maintained at 110–140° C. A stream of nitrogen (410 cc. per minute measured at N.T.P.) was passed downwards through the column concurrently.

The catalyst pellets had been prepared by steeping pellets made by sintering a mixture of 90% by weight of silica and 10% by weight of a glass in dilute sulfuric acid, separating the excess acid by filtration under suction, and drying in the reactor at the reaction temperature.

The vapors leaving the base of the reactor were condensed, giving a condensate containing 22.8 grams of recovered methacrylic acid (corresponding to a conversion of 84.6%) and 126.8 grams of methyl methacrylate (corresponding to a yield of 92.5%).

Following the procedures already set out in detail, acrylic acid and ethanol are employed as starting materials to produce ethyl acrylate. Similarly, starting with methacrylic acid and butanol, the product obtained is butyl methacrylate.

While the invention has been described herein with regard to certain specific embodiments, it is not so limited. It is to be understood that variations and modifications thereof may be made by those skilled in the art without departing from the spirit and scope of the invention.

What is claimed is:

1. In a process for the production of an ester of acrylic acid wherein the vapor of an acid selected from the group consisting of acrylic acid and α-lower alkyl acrylic acid is heated with the vapor of a lower alkanol, the improvement which comprises having said vapors in contact with an acid catalyst selected from the group consisting of sulfuric acid, phosphoric acid, benzene sulfonic acid, and toluene sulfonic acid, said catalyst being absorbed on a solid support and said heating being at a temperature of at least about 70° C.

2. A process as defined in claim 1 wherein said heating is at a temperature of from about 70° C. to about 250° C.

3. A process as defined in claim 1 wherein said vapors are diluted with an inert gas, and the molar ratio of alkanol to acid reactant is from about 1.5:1 to about 10:1.

4. A process as defined in claim 3 wherein the acid is an α-lower alkyl acrylic acid.

5. A process as defined in claim 4 wherein the catalyst is sulfuric acid and the solid support is granular.

6. A process as defined in claim 4 wherein the catalyst is toluene sulfonic acid and the solid support is granular.

7. A process as defined in claim 4 wherein the acrylic acid is methacrylic acid and the alkanol is methanol.

References Cited
UNITED STATES PATENTS

| | | | |
|---|---|---|---|
| 2,184,934 | 12/1939 | Bruson et al. | 260—486 |
| 2,464,768 | 3/1949 | Redman et al. | 260—486 |
| 2,644,839 | 7/1953 | Zettlemoyer et al. | 260—486 |
| 2,980,730 | 4/1961 | Dobson | 260—486 |
| 2,916,512 | 12/1959 | Fisher et al. | 260—486 |
| 2,917,538 | 12/1959 | Carlyle | 260—486 |
| 2,947,779 | 8/1960 | Idol et al. | 260—486 |

LORRAINE A. WEINBERGER, *Primary Examiner.*

RICHARD K. JACKSON, *Examiner.*

A. P. HALLUIN, *Assistant Examiner.*